(12) United States Patent
Lee et al.

(10) Patent No.: US 11,097,985 B2
(45) Date of Patent: Aug. 24, 2021

(54) CARBON COMPOSITE COMPOSITION AND CARBON HEATER MANUFACTURED USING THE SAME

(71) Applicants: LG ELECTRONICS INC., Seoul (KR); INDUSTRY FOUNDATION OF CHONNAM NATIONAL UNIVERSITY, Gwangju (KR)

(72) Inventors: Youngjun Lee, Seoul (KR); Kap Seung Yang, Gwangju (KR); Sang Wan Kim, Gyeonggi-do (KR)

(73) Assignees: LG ELECTRONICS INC., Seoul (KR); INDUSTRY FOUNDATION OF CHONNAM NATIONAL UNIVERSITY, Gwangju (KR)

(*) Notice: Subject to any disclaimer, the term of this patent is extended or adjusted under 35 U.S.C. 154(b) by 142 days.

(21) Appl. No.: 15/975,348

(22) Filed: May 9, 2018

(65) Prior Publication Data
US 2018/0327323 A1 Nov. 15, 2018

(30) Foreign Application Priority Data
May 10, 2017 (KR) .................. 10-2017-0058076

(51) Int. Cl.
*C04B 35/565* (2006.01)
*C04B 35/634* (2006.01)
(Continued)

(52) U.S. Cl.
CPC ........ *C04B 35/565* (2013.01); *C04B 35/6303* (2013.01); *C04B 35/63476* (2013.01);
(Continued)

(58) Field of Classification Search
None
See application file for complete search history.

(56) References Cited

U.S. PATENT DOCUMENTS

| 3,189,778 A | 6/1965 | Brundige |
| 4,525,461 A * | 6/1985 | Boecker ............... C04B 35/565 501/90 |

(Continued)

FOREIGN PATENT DOCUMENTS

| CN | 1796334 | 7/2006 |
| CN | 1946655 | 4/2007 |

(Continued)

OTHER PUBLICATIONS

Polyak et al.; Science for Ceramic Production; High-Carbon Binders in Refractories and Corrosion-Resistant Ceramics Technology; vol. 55, No. 5-6, 1998.*

(Continued)

*Primary Examiner* — Guinever S Gregorio
(74) *Attorney, Agent, or Firm* — KED & Associates LLP (57) ABSTRACT

A carbon composite composition and a carbon heater are provided. The carbon composite composition may include a phenolic resin as a binder, a lubricant, and a base material that determines a specific resistance of a resistance heating element at a high temperature. The carbon composite composition may prevent a dielectric breakdown, a spark and plasma from occurring in a carbon heater, and may improve radiation efficiency of the carbon heater.

14 Claims, 7 Drawing Sheets

(51) Int. Cl.
*H05B 3/14* (2006.01)
*C04B 35/63* (2006.01)
*H05B 3/64* (2006.01)
*C08L 61/06* (2006.01)
*C08K 3/04* (2006.01)

(52) U.S. Cl.
CPC ............ *H05B 3/145* (2013.01); *H05B 3/148* (2013.01); *H05B 3/64* (2013.01); *C04B 2235/3217* (2013.01); *C04B 2235/3418* (2013.01); *C04B 2235/3826* (2013.01); *C04B 2235/425* (2013.01); *C04B 2235/6025* (2013.01); *C08K 3/04* (2013.01); *C08L 61/06* (2013.01)

(56) References Cited

U.S. PATENT DOCUMENTS

| | | | |
|---|---|---|---|
| 5,420,399 | A | 5/1995 | Sekhar et al. |
| 6,146,550 | A | 11/2000 | Le Boulch et al. |
| 6,501,056 | B1 | 12/2002 | Hirohata |
| 7,769,278 | B2 | 8/2010 | Kim |
| 10,542,587 | B2 | 1/2020 | Gagnon |
| 2001/0055478 | A1 | 12/2001 | Scherzer |
| 2002/0142146 | A1 | 10/2002 | Gadow et al. |
| 2002/0160902 | A1 | 10/2002 | Lesniak |
| 2003/0180538 | A1 | 9/2003 | Gray |
| 2004/0043687 | A1 | 3/2004 | Kikuta |
| 2004/0217111 | A1 | 11/2004 | Grob |
| 2005/0179152 | A1 | 8/2005 | Bauer |
| 2006/0272796 | A1 | 12/2006 | Asmussen et al. |
| 2007/0032370 | A1 | 2/2007 | Weisensel et al. |
| 2007/0034620 | A1 | 2/2007 | Lee |
| 2007/0110413 | A1 | 5/2007 | Konishi |
| 2007/0117722 | A1 | 5/2007 | Odaka |
| 2008/0006620 | A1 | 1/2008 | Lee |
| 2008/0217323 | A1 | 9/2008 | Baek |
| 2012/0052196 | A1* | 3/2012 | Ma ............................ F27D 1/10 427/140 |
| 2018/0327323 | A1 | 11/2018 | Lee |
| 2018/0343704 | A1 | 11/2018 | Lee |

FOREIGN PATENT DOCUMENTS

| | | |
|---|---|---|
| CN | 101562914 | 10/2009 |
| CN | 101765253 | 6/2010 |
| CN | 101880174 | 11/2010 |
| CN | 102558609 | 7/2012 |
| CN | 104755554 | 7/2015 |
| DE | 4413127 | 10/1995 |
| EP | 0 971 561 | 1/2000 |
| EP | 1 385 357 | 1/2004 |
| EP | 1741685 | 1/2007 |
| FR | 1300359 | 8/1962 |
| GB | 976468 | 11/1964 |
| JP | 10172738 | 6/1998 |
| JP | 11-354257 | 12/1999 |
| JP | 2012-051748 | 3/2012 |
| JP | 2016-67993 | 5/2016 |
| KR | 10-2007-0003836 | 1/2007 |
| KR | 10-2010-0117684 | 11/2010 |
| KR | 10-2011-0109697 | 10/2011 |
| KR | 10-2013-0091382 | 8/2013 |
| KR | 10-2015-0141382 | 12/2015 |
| WO | WO 93/14044 | 7/1993 |

OTHER PUBLICATIONS

European Office Action dated Sep. 5, 2019.
Korean Office Action dated Nov. 14, 2018 issued in Application No. 10-2017-0058076.
European Search Report dated Nov. 30, 2018 issued in Application No. 18171796.8.
Gerhard Brauer, et al., HeT-SiC-05, International Topical Workshop on Heteroepitaxy of 3C-SiC on Silicon and its Application to Sensor Devices, Hotel Erbgericht Krippen, Germany, Apr. 26, 2005 to May 1, 2005 (ISSN 1437-322X).
Korean Office Action dated Dec. 26, 2018 issued in Application No. 10-2017-0065488.
European Search Report dated Feb. 18, 2019 issued in Application No. 18174315.4.
Chinese Office Action dated Aug. 12, 2020 issued in Application No. 201810520993.3.
U.S. Office Action dated Aug. 10, 2020 issued in U.S. Appl. No. 15/986,107.
Chinese Office Action dated Oct. 27, 2020 issued in Application No. 201810443605.6.
Kim et al., "Effects of carbon and silicon on electrical, thermal, and mechanical properties of porous silicon carbide ceramics, "Mar. 2020, Ceramics International, pp. 15594, 15599-15601. (Year: 2020).
U.S. Final Office Action dated Feb. 12, 2021 issued in U.S. Appl. No. 15/986,107.
Korean Office Action dated May 29, 2018 issued in Application No. 10-2017-0058076.
Korean Office Action dated Jun. 5, 2018 issued in Application No. 10-2017-0065488.
Park et al., "Single-Crystal Growth Process of Silicon Carbide and Application Fields Thereof" Ceramist, vol. 13, Issue 6 (Dec. 2010), pp. 64-74. (English Abstract and Full Korean Text).
Chen et al., "Macro/Micro Structure Dependence of Mechanical Strength of Low Temperature Sintered Silicon Carbide Ceramic Foams" Ceramics International, 38 (2012), pp. 5223-5229. (Full English Text).
U.S. Appl. No. 15/986,107, filed May 22, 2018.

* cited by examiner

(S) : SiC / SiO$_2$

FIG. 8

CARBON COMPOSITE COMPOSITION AND CARBON HEATER MANUFACTURED USING THE SAME

CROSS-REFERENCE TO RELATED APPLICATIONS

This application claims priority under 35 U.S.C. § 119 to Korean Application No. 10-2017-0058076, filed on May 10, 2017, whose entire disclosure is herein incorporated by reference.

This application relates to U.S. application Ser. No. 15/986,107, filed on May 22, 2018, which is hereby incorporated by reference in its entirety. Further, one of ordinary skill in the art will recognize that features disclosed in these above-noted applications may be combined in any combination with features disclosed herein.

BACKGROUND

1. Field

A carbon composite composition for manufacturing a heating element and a carbon heater manufactured using a carbon composite composition are disclosed herein.

2. Background

Figure 1:
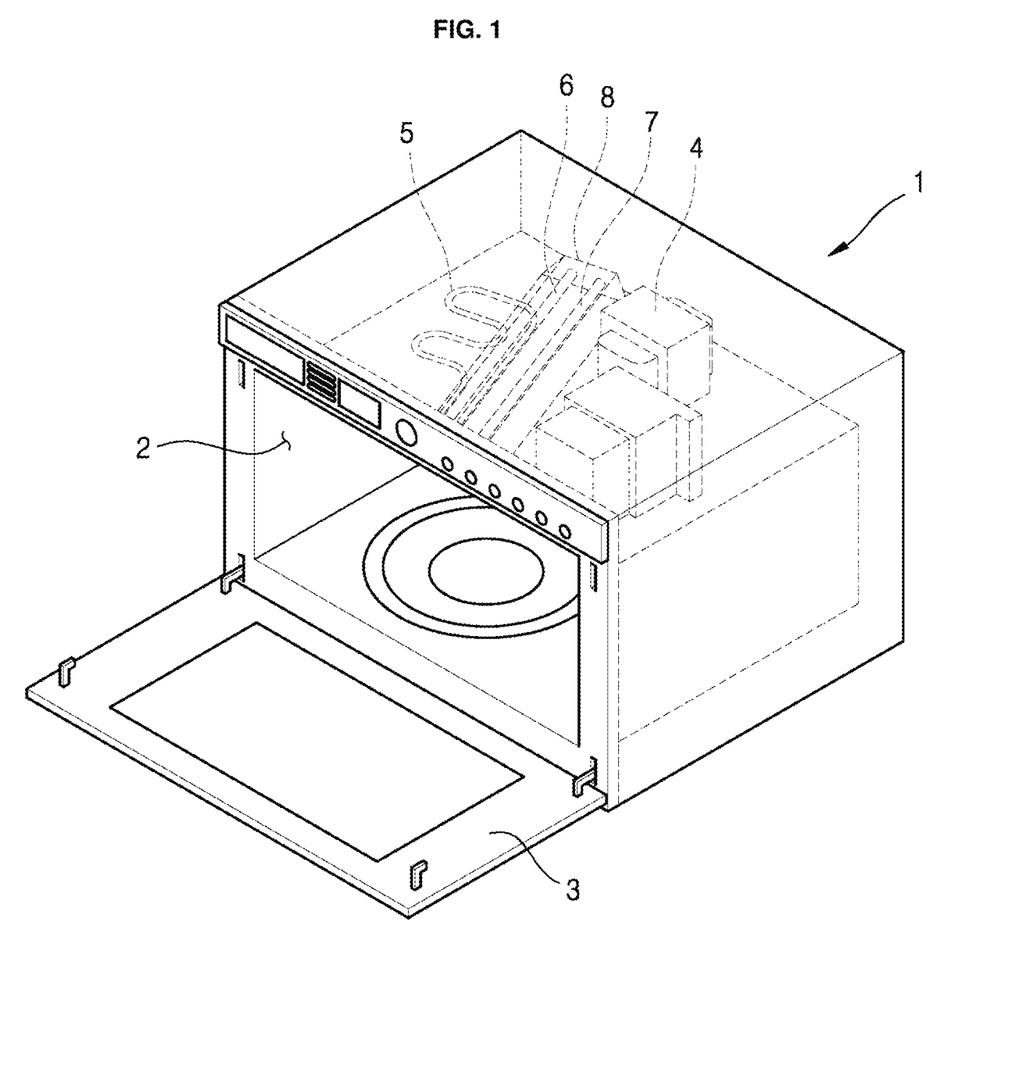
FIG. 1 is a perspective view of an oven.

An oven may be used as a cooking appliance to heat items in a home or in a commercial setting. Referring to FIG. 1, an oven 1 may be provided with a cavity 2 in which items such as food may be placed, a door 3 to selectively open the cavity 2, and a plurality of heaters 6, 7 to apply heat to the cavity 2.

The heaters 6, 7 may be protected by a cover 8 from an exterior of the cavity 2. In order to apply electromagnetic wave heat, a magnetron 4 may be provided on the exterior of an upper surface of the cavity 2. The magnetron 4 generates electromagnetic waves, and the generated electromagnetic waves may be radiated to an inner space of the cavity 2 through a predetermined waveguide and a stirrer. In addition, a sheath heater 5 may be provided on an upper side of the inner space of the cavity, as needed.

Heaters may be different from each other in terms of, for example, operation, material, and heating methods. A carbon heater, which may be used as sheath heater 5 and heater 6, may be a grill heater that heats food inside the cavity 2 using radiant heat. A carbon fiber (CF) may be used for a carbon heater. CF may refer to a fibrous carbon material having a carbon content of 90% or more. Such CF may be widely used in various fields because it has flexibility, high strength, high elasticity, and adsorbability, as well as basic properties of a carbon material, such as, e.g., heat resistance, chemical stability, electrical conductivity, thermal conductivity, mechanical strength, and biocompatibility. CF has a high thermal conductivity, a low coefficient of thermal expansion, and high thermal shock resistance. Recently, CF has been widely used as a structural material or a functional material for high temperature devices, such as, for example, heat rays and heaters.

Figure 2:
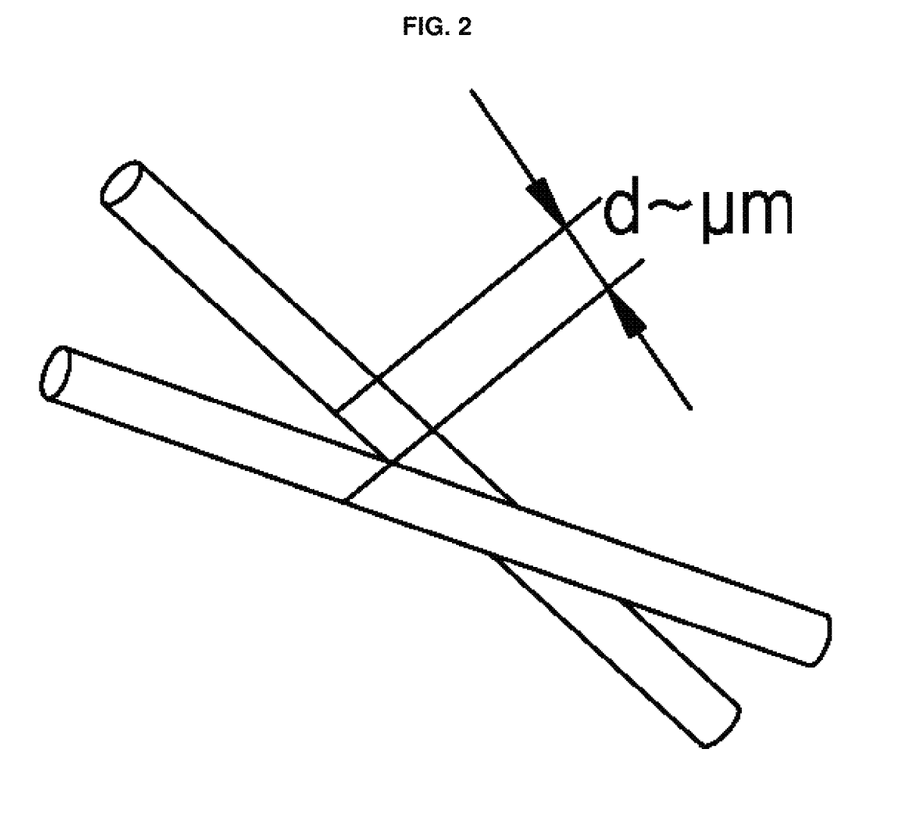
FIG. 2 is an enlarged view of carbon fiber.

Since the CF is made of carbon, it has a microwave absorption property of carbon itself. CF has an inherent property that a ratio of a fiber length to a fiber diameter is very large in terms of fiber shape. The inherent properties of such CF may cause some problems when the CF is used as a heating source such as in an oven. As shown in FIG. 2, CF is made of single carbon filaments. The filaments each have a diameter of several micrometers (μm) and an interval between the filaments may be several micrometers (μm). Thus, under high electromagnetic fields, a high voltage may be applied to a very narrow distance or interval between the filaments. For example, when a voltage of 10 V is applied to an interval of 1 μm, a high voltage of about 107 V/m may be applied between filaments. In this case, the filaments may likely cause a dielectric breakdown, and sometimes a spark may occur.

The carbon heater may include a carbon fiber, a connector that applies electricity to the carbon fiber, a quartz tube including the carbon fiber and the connector, and an assembly or a unit composed of encapsulation gas, such as, for example, Ar, sealed in the tube. The encapsulation gas may maintain a vacuum atmosphere of about $10^{-1}$ to $10^{-2}$ torr. However, as described above, when a high voltage is applied between the filaments, plasma may be produced due to an inert gas atmosphere under a high voltage, even though a dielectric breakdown or a spark of the filaments may not occur.

A shield member may be provided between a carbon heater and a cabin to suppress a reaction of the plasma and progress of light to the cabin due to the plasma. However, since the shield member may not only shield plasma light, but may also partially block radiation light emitted from the carbon heater, radiation efficiency of the oven may be greatly lowered.

KR Patent Application Publication No. 10-2011-0109697 (Oct. 6, 2011) discloses an oven of the related art, which is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein.

DETAILED DESCRIPTION

A carbon composite composition of the present disclosure may include an inorganic powder, which may serve as a main component of a heating element to be used as or in a high temperature heater, and a binder that couples the inorganic powder particles with one another. Referring to Table 1 below, for the inorganic power, silicon carbide (SiC), silicon oxide ($SiO_2$) and aluminum oxide ($Al_2O_3$) may be used. Zirconium oxide ($ZrO_2$), boron nitride (BN) and molybdenum silicide ($MoSi_2$) may also be taken into consideration, but $ZrO_2$ and $MoSi_2$ have too low specific resistances to be used as a heater, and BN has too high a melting point, which may lead to an excessively high heat treatment temperature. For this reason, $ZrO_2$, BN, and $MoSi_2$ may not be applied.

TABLE 1

Properties of inorganic powders

|  | Silicon Carbide | Silicon Oxide | Aluminium Oxide | Zirconium Oxide | Boron Nitride | Molybdenum Silicide |
| --- | --- | --- | --- | --- | --- | --- |
| Melting point (° C.) | 2,730° C. | 1,600° C. | 2,072° C. | 2,715° C. | 2,973° C. | 2,030° C. |
| Specific resistance ($\Omega \cdot cm$) | $>10^8$ | $>10^{14}$ | $>10^{14}$ | $>10^4$ | $>10^{13}$ | $2 * 10^{-5}$ |
| Thermal conductivity (W/m · K) | 41 | 1.5 | 35 | 2.7 | 20 | 25 |

The carbon composite composition may be characterized by including at least one of the above discussed inorganic powders. It may be necessary to include SiC since SiC, which has the lowest specific resistance among SiC, $SiO_2$, and $Al_2O_3$ inorganic powders, may stably maintain a specific resistance and an electric conductivity, which may be necessary properties for a heater. If the carbon composite composition is formed without SiC, the specific resistance may be too high to be used as a heater. $SiO_2$ and $Al_2O_3$ in addition to SiC may be added as specific resistance controlling agents to control a specific resistance of a carbon heater since they have high specific resistances.

Since the melting point of $SiO_2$ is lower than that of $Al_2O_3$, control or increase of a specific resistance of the carbon heater may be more easily controlled when a final heat treatment is performed thereon.

SiC may be added in an amount of 50 to 75% based on the total weight of the composition for the following reasons. When a content of SiC is less than 50%, a specific resistance of a carbon heater is excessively high and a thermal conductivity thereof is lowered, and thus disconnection may be likely to occur. When the content of SiC exceeds 75%, the specific resistance of the carbon heater may be lowered so that it may be difficult to use such carbon heater as a heater.

$SiO_2$ may be added at a maximum of 24% based on the total weight of the composition for the following reasons. When a content of $SiO_2$ exceeds 24%, thermal conductivity of the carbon heater is drastically lowered and thus a terminal disconnection may occur. In addition, when the manufactured carbon heater has an excessively high specific resistance due to a high specific resistance in $SiO_2$, additional design changes, such as, for example, reducing a length of the heater or widening a cross-sectional area of the heater, may be required.

A phenolic resin may perform functions of both a binder resin and a carbon raw material. Phenolic resin is one of the oldest synthetic resins, and it has excellent heat resistance and flame retardancy. Phenolic resin may be synthesized by a reaction of phenol and formaldehyde, and properties of phenolic resin greatly vary depending on acidity of a catalyst used therefor.

A novolac resin is produced when the catalyst is an acid. Novolac resin may be obtained by reacting phenol and formaldehyde in a formaldehyde to phenol molar ratio of 0.5:1 to 1:1 in the presence of an acidic catalyst, such as, for example, sulfuric acid, hydrochloric acid, and oxalic acid. Under acidic catalysis, a condensation reaction may occur rapidly, and the novolac resin may have a structure in which a large number of phenol nuclei are linked by a methylene group. Novolac resin is a thermoplastic resin, so that the novolac resin has a property of not being cured without a curing agent. The novolac resin may be cured by condensation curing or thermal curing, normally mixed with hexamine and cured by heating.

A resol resin may be obtained by reacting phenol and formaldehyde in a formaldehyde to phenol molar ratio of 1:1 to 3:1 in the presence of a basic catalyst, such as, for example, caustic soda or ammonia. Since a condensation reaction may occur more slowly than in an addition reaction, the resol resin may be produced as a compound of phenol alcohol having a relatively low molecular weight. That is, the resol resin has a structure in which many methylol groups are substituted in the phenol nucleus. Such resol resin has a property of being cured at a room temperature or at a moderate temperature without a curing agent. Thus, the novolac resin may be more suitable as the phenolic resin. Description thereon is set forth as follows.

As described above, the carbon composite composition includes an inorganic powder to manufacture a carbon heater. In order to form a structure using such inorganic powder, it may be necessary to perform an extrusion process to form a desired structure shape between a mixing process and a stabilization process or during a subsequent step. The extrusion process is a process used in the technical field of using a resin. In the resol resin, a curing reaction rapidly proceeds at a temperature and pressure at which the extrusion process is generally performed, and the carbon composite composition is cured before a carbon electrode is formed into a desired shape, so that extrusion molding may be impossible.

The novolac resin according to embodiments may be added in an amount of 15 to 30% based on the total weight of the composition. When a content of the novolac resin is less than 15%, the carbon composite composition obtained by performing the extrusion process is easily broken. Also, a content of carbon in the finally produced carbon heater may be too low, so that the specific resistance of the carbon heater may become higher in comparison to a specification thereof. When the content of the novolac resin exceeds 30%, the carbon composite composition may have poor stability in terms of a shape after an injection process is performed thereon, and the finally manufactured carbon heater may be more likely to have a dimensional defect. The carbon content in the carbon heater may become higher, whereby the specific resistance of the carbon heater may be lower in comparison to the specification thereof.

The carbon composite composition may include a lubricant to reduce friction between the composition and a die during the extrusion process. As a final product is a carbon heater, it may be preferable to include carbon as a lubricant. Graphite, carbon black, and activated carbon may be used as the lubricant. For example, graphite, which is a widely used lubricant, has excellent lubrication properties during the extrusion process.

According to embodiments disclosed herein, the novolac resin may function as a curing agent and the graphite may function as a lubricant. As described above, generally, a novolac resin is not cured by itself. A curing agent called "hexamine" is usually required for thermal curing. However, the carbon composite composition of the present disclosure is cured without the curing agent after the extrusion process is performed thereon when graphite is included in the carbon composite composition.

The graphite may be added in an amount of 0.1 to 10% based on the total weight of the composition. When a content of the graphite is less than 0.1%, the friction between the composition and the die increases during the extrusion process, and after the extrusion process, curing may be insufficient and the carbon composite may have poor stability in terms of shape, and thereby the finally manufactured carbon heater may be more likely to have a dimensional defect. When the content of the graphite exceeds 10%, the curing reaction proceeds too quickly during the extrusion process, which makes processing such as extruding difficult, and the carbon content in the finally manufactured carbon heater becomes higher, whereby the specific resistance of the carbon heater may be lower in comparison to the specification thereof.

A method for manufacturing a carbon heater using the carbon composite composition of the present disclosure is described. A method used to manufacture another functional material using the carbon composite composition may be applied to the carbon heater manufacturing method of the present disclosure.

Figure 3:
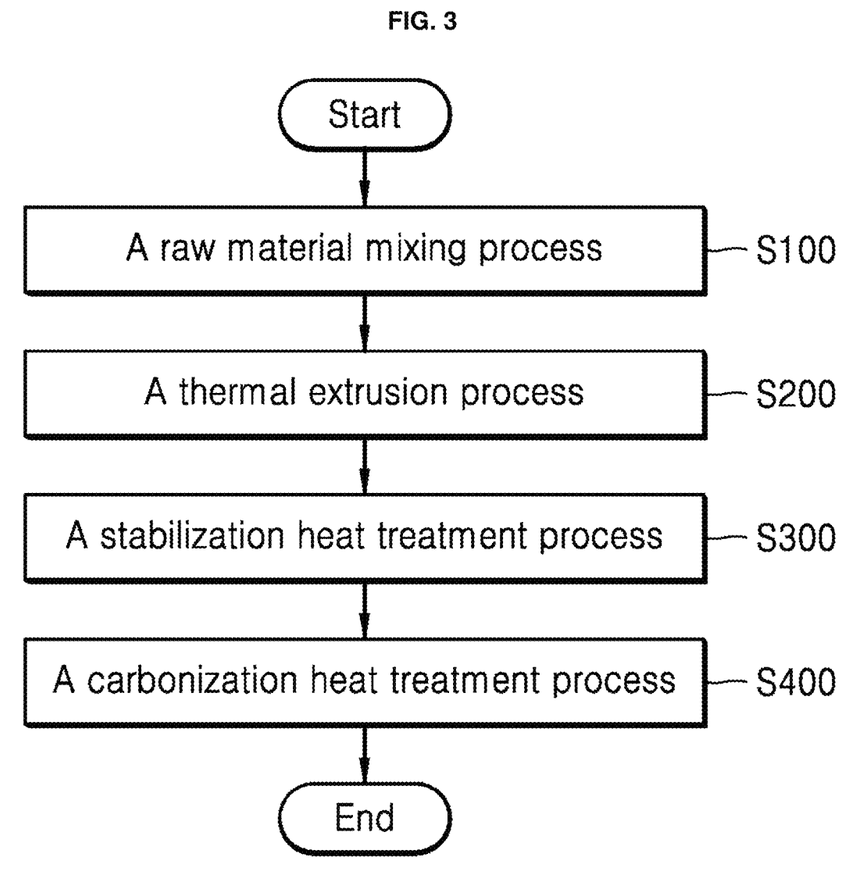
FIG. 3 is a flow chart schematically showing a method for manufacturing a carbon heater using a carbon composite composition according to an embodiment.

As shown in FIG. 3, the manufacturing method may start with a process of mixing an inorganic power and a phenolic resin binder (S100). In the mixing process, raw materials each having desired components and composition ranges may be sufficiently mixed for a desired or predetermined time using an apparatus, such as, for example, an attrition mill.

Next, the mixed raw materials may be thermally extruded using an extruder widely used in the field of polymer injection (S200). An extrusion condition used for the present disclosure was a speed of 60 rpm at 100 to 200° C., but the extrusion condition is not limited thereto. The extrusion condition may be changed depending on components and composition ranges of the inorganic powder and the binder.

The extruded carbon composite composition may be subjected to a stabilization heat treatment process at a high temperature (S300). The stabilization heat treatment process is to cure the binder so that the extruded carbon composite composition may maintain its extruded shape. In the present disclosure, the stabilization heat treatment process was performed at 200 to 300° C. for 0.1 to 2 hours.

Next, the cured carbon composite composition may be subjected to a carbonization heat treatment process (S400). The carbonization heat treatment process is to produce an active component of the carbon heater that is a final product, and may include a first step of out-gassing components, which volatilize a volatile component among the components constituting the carbon composite composition, and a second step of carbonizing the remaining components subsequent to the out-gassing step.

The carbonization heat treatment process may be divided into two steps. First, a first carbonization heat treatment process may be performed at a relatively low temperature of 600-1,000° C. for 0.1 to 2 hours, and the first carbonization heat treatment process may volatilize components other than carbon among binder components, and other components other than carbon which may exist in impurities and the like included in components other than the binder components among components of the composition. A second carbonization heat treatment process may be performed, immediately after the first carbonization heat treatment process. The second carbonization heat treatment process may be performed at 1,200 to 1,400° C. for 0.5 to 3 hours, and may carbonize components of the carbon composite composition remaining after the first carbonization heat treatment process. In order to improve productivity, the first and second carbonization heat treatment processes may be integrated and operated in a single carbonization heat treatment process.

A separate post-treatment process may be included to adjust or improve mechanical and/or electrical properties of the carbon heater subsequent to the carbonization heat treatment process. The carbon composite produced after the second heat treatment process may be combined with a connector and a sealing tube to manufacture the carbon heater that is the final product.

Hereinafter, the present disclosure will be described in more detailed through various examples and comparative examples. The following examples are merely exemplary to more clearly describe the present disclosure, and are not limited thereto.

Comparative Example 1

First, a binary composition was prepared by mixing 1 type of inorganic powder selected from a group of SiC, $SiO_2$, $Al_2O_3$ and $ZrO_2$ shown in Table 1 above with a novolac resin as a binder. The prepared binary composition was mixed uniformly through a step of mixing raw materials, and then extruded.

Figure 4:
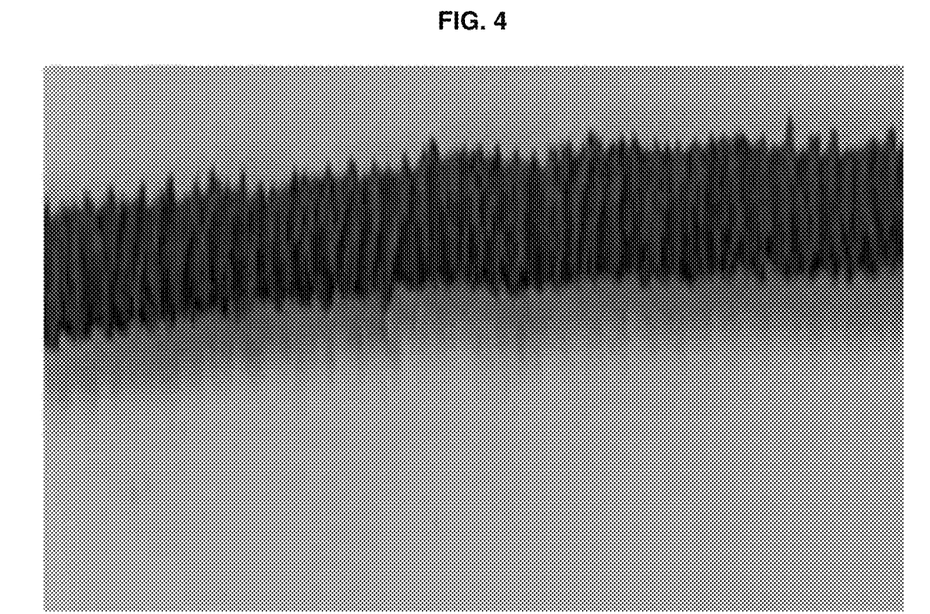
FIG. 4 shows a carbon composite extruded using a binary carbon composite composition according to an embodiment.
Figure 5:
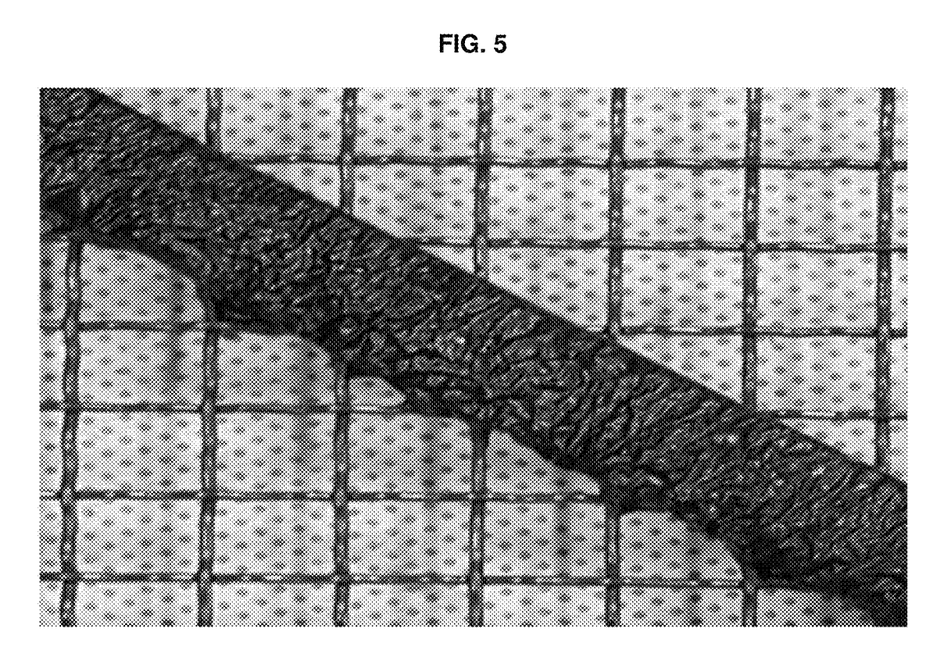
FIG. 5 shows a carbon composite which is heat treated for stabilization using a binary carbon composite composition according to an embodiment.

FIG. 4 and FIG. 5 show the carbon composite extruded and the carbon composite subjected to the stabilization heat treatment using the binary carbon composite composition, respectively. As shown in FIGS. 4 and 5, it was impossible to extrude the binary carbon composite composition into a desired shape due to extremely low mechanical stability after extrusion molding and molding are performed thereon (FIG. 4), and the binary carbon composite composition had dimensional and surface defects, which may make it impossible to be used as a carbon heater even through the stabilization heat treatment was performed thereon after the curing agent is added (FIG. 5).

Example 1

A ternary carbon composite composition was prepared by adding 23% of the novolac resin as a binder and 3% of the graphite as a lubricant to 74% of SiC among the inorganic power components shown in Table 1 above. The novolac resin used in this Example had a number average molecular weight in the range of 1,000 to 10,000, that is, a number of average molecular weight in the range of 3,000 to 7,000. The prepared ternary composition was mixed uniformly through the step of mixing raw materials and extruded, and subsequently was subjected to the stabilization heat treatment and the carbonization heat treatment processes, followed by being processed into a final carbon heater. Electrical properties of the final carbon heater were evaluated.

Figure 6A:
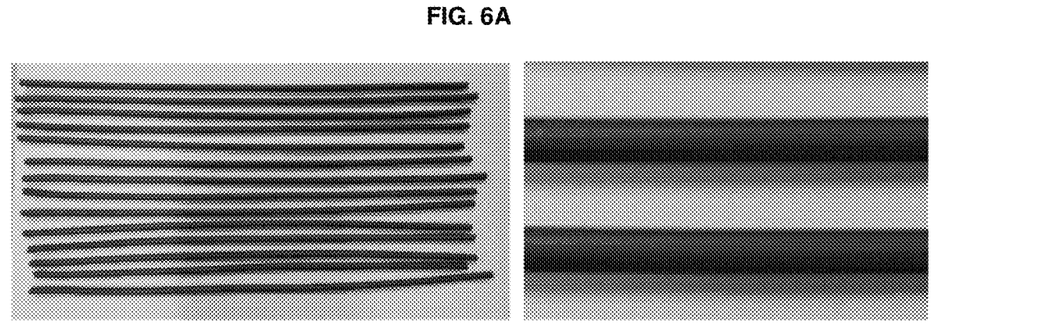
FIG. 6A is a surface of a carbon composite heat treated for stabilization using a ternary carbon composite composition according to an embodiment.
Figure 6B:
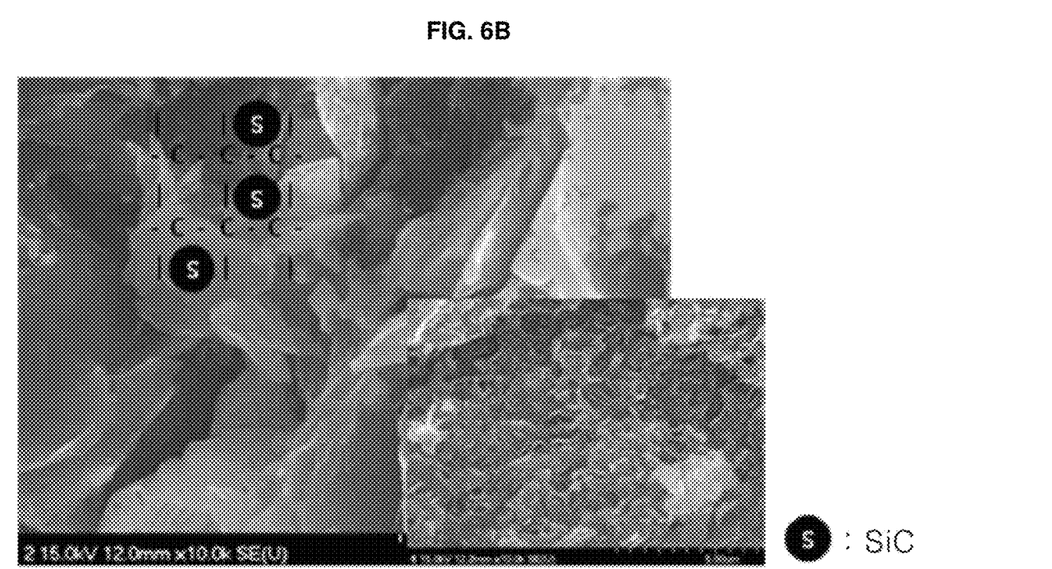
FIG. 6B is a cross-section of the carbon composite heat treated for stabilization using the ternary carbon composite composition.

FIGS. 6A and 6B show a surface and a cross-section of the ternary carbon composite after the stabilization heat treatment process is performed thereon. The carbon composite composed of the ternary composition has excellent macroscopic mechanical stability and almost no defect on the surface thereof. Also, SiC is very uniformly distributed by the binder even in the cross-sectional microstructure of the carbon composite without segregation, agglomeration, or macro voids.

A carbon heater was manufactured using the ternary composition of Example 1, and the electrical properties thereof were evaluated. Electrical resistance of the carbon heater was measured to be about 4 to 5Ω at an applied voltage of 115 V.

Comparative Example 2

As Comparative Example 2 with respect to Example 1, another ternary carbon composite composition was prepared to include the inorganic powder substituted only with $SiO_2$ or $Al_2O_3$ instead of SiC and the other components and composition ranges same as those of Example 1.

The carbon composite composition of Comparative Example 2 was identified to have the same level of mechanical stability as that of Example 1. However, the electrical resistance of the carbon heater manufactured using the carbon composite composition of Comparative Example 2 was measured to be close to infinity at an applied voltage of 115 V. Thus, when only oxide is included as a base material of the carbon heater, it is very difficult to be used as a carbon heater.

Example 2

A quaternary carbon composite composition was prepared by adding a novolac resin as a binder and graphite as a lubricant to an inorganic powder which is based on SiC and further includes $SiO_2$ as a specific resistance controlling agent among the inorganic power components shown in Table 1 above. In the same manner as in Example 1, the prepared quaternary composition was mixed uniformly through the step of mixing raw materials and extruded, and subsequently was subjected to the stabilization heat treatment and the carbonization heat treatment processes, followed by being processed into a final carbon heater. Electrical properties of the final carbon heater were evaluated.

Figure 7A:
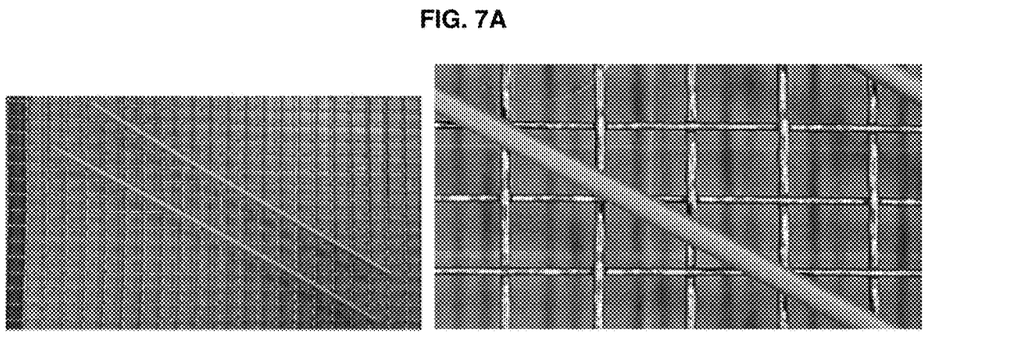
FIG. 7A is a surface of a carbon composite heat treated for stabilization using a quaternary carbon composite composition according to an embodiment.
Figure 7B:
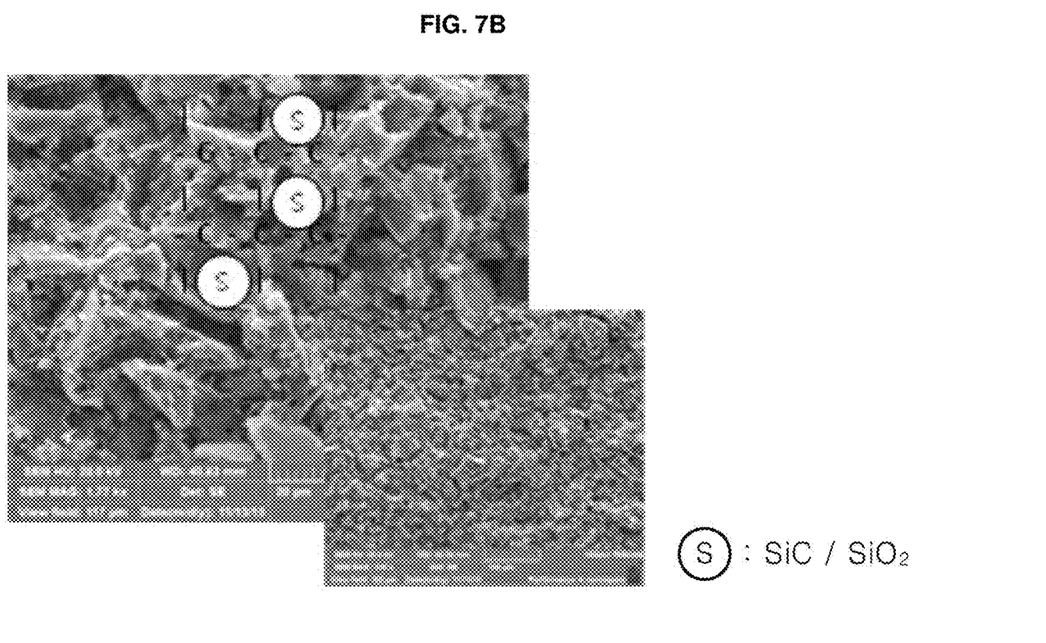
FIG. 7B is a cross-section of a carbon composite heat treated for stabilization using the quaternary carbon composite composition.

FIGS. 7A and 7B show a surface and a cross-section of the quaternary carbon composite after the stabilization heat treatment process is performed thereon. The carbon composite composed of the ternary composition has excellent macroscopic mechanical stability and almost no defect on the surface thereof. Also, SiC is uniformly distributed by the binder even in the cross-sectional microstructure of the carbon composite without segregation, agglomeration, or macro voids. In particular, SiC and $SiO_2$ were uniformly distributed without macroscopic/micro segregation.

The following Table 2 shows electrical properties of a carbon heater made of ternary and quaternary carbon composites. In Table 2, PN, GP, SC and SO represent the novolac resin, graphite, SiC and $SiO_2$, respectively. As shown in Table 2, the more the content of $SiO_2$ increases, the more the electrical resistance of the carbon heater increases, whereas the more the electrical conductivity of the carbon heater decreases. Such experimental results indicate that the electrical resistivity of the carbon heater made of the quaternary carbon composite may be controlled as needed, which means that the degree of freedom of electrical design may be greatly improved in comparison to the carbon heater made of the ternary carbon composite. Conversely, when the content of silicon oxide exceeded 24%, the thermal conductivity thereof was drastically lowered, and thus a terminal disconnection occurred.

TABLE 2

Electrical properties of a carbon heater

|  | PN23 GP03 SC49 SO25 | PN23 GP03 SC56 SO18 | PN23 GP03 SC59 SO15 | PN23 GP03 SC62 SO12 | PN23 GP03 SC74 |
|---|---|---|---|---|---|
| Applied voltage | 115 V | 115 V | 115 V | 115 V | 115 V |
| Length (m) | 22.00 | 23.00 | 22.30 | 20.00 | 20.00 |
| Electrical resistance (Ω) | 720.30 | 88.63 | 29.13 | 12.93 | 4~5 |
| Electrical conductivity (S/cm) | 0.21 | 1.18 | 6.25 | 12.50 | 46.00 |

Figure 8:
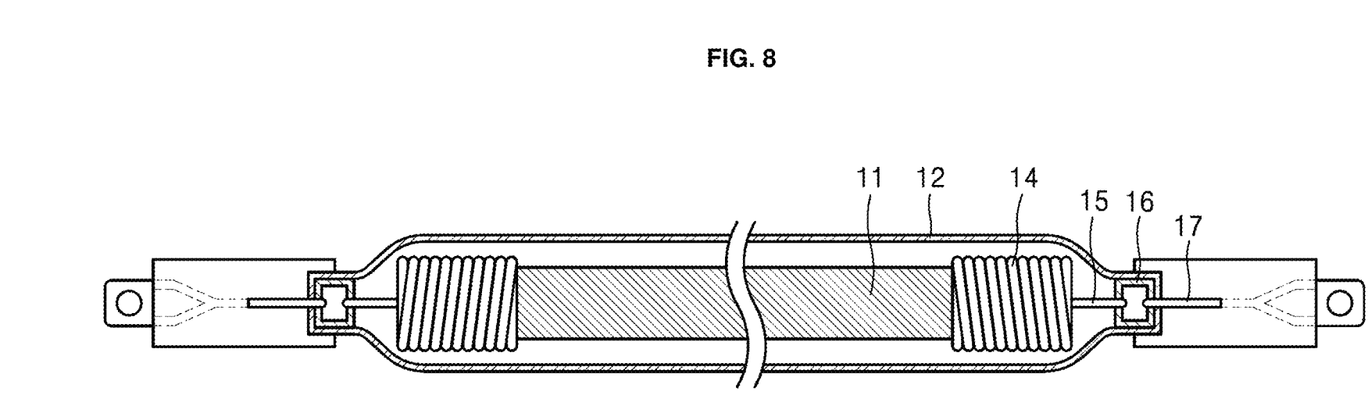
FIG. 8 show a carbon heater made of a heating element using a composition according to an embodiment.

FIG. 8 shows a carbon heater product made of a heating element 11 using the carbon composite composition. The carbon heater may include the heating element 11 and a connector 14 to support the heating element 11 and supply power from outside. Also, the carbon heater may further include a tube 12 that encloses the heating element 14 and contains inert gas, a metal wire 15 that supplies electricity to the heating element 11 from outside, a metal piece 16, and an outer electrode 17.

Embodiments disclosed herein provide a carbon composite composition for a new carbon heater which may not cause a dielectric breakdown or a spark even under a high voltage in a carbon heater. Embodiments disclosed herein also provide a carbon composite composition for a new carbon heater which may not cause plasma even under encapsulation gas and a high voltage in a carbon heater.

According to embodiments disclosed herein, a carbon composite composition may include a phenolic resin as a binder, a lubricant, and a base material determining a specific resistance of a resistance heating element at a high temperature. The base material may be silicon carbide (SiC). SiC may be included in an amount of 50 to 75 wt. % (hereafter referred to as "%"), based on the total weight of the composition.

The composition may further include a specific resistance controlling agent. The specific resistance controlling agent may be silicon oxide ($SiO_2$). $SiO_2$ may be included in an amount of 24% or less, based on the total weight of the composition.

The phenolic resin may be a novolac resin. The novolac resin may be included in an amount of 15 to 30%, based on the total weight of the composition.

The lubricant may act as a curing agent. The lubricant may be graphite. The graphite may be included in an amount of 0.1 to 10%, based on the total weight of the composition.

In order to solve the above-described technical issues, a carbon heater may include any one of the aforementioned compositions according to embodiments disclosed herein. Unlike a carbon heater using a conventional carbon fiber, the carbon composite composition may not generate a local concentration of voltage between filaments, which is a disadvantage inherent in a fiber shape, thereby preventing a dielectric breakdown or a spark from occurring. Further, unlike the carbon heater using the conventional carbon fiber, the carbon composite composition may fundamentally prevent plasma from occurring between filaments due to a local high voltage, and improve a decline in radiation efficiency because a shield member may not be necessary.

The carbon composite composition has no restriction on a shape, which is an inherent property of a composition, and thereby it may be possible to easily manufacture a carbon heater of a desired shape necessary for an oven having various sizes and shapes. In addition, the carbon composite composition may control a specific resistance and an output of the carbon heater by changing constituent components and composition ranges of the composition, and thereby it may be possible to improve a degree of freedom of an electrical design of the carbon heater.

The carbon composite composition may be excellent in resistance to surface oxidation or surface erosion, which may occur frequently at a high temperature since a surface area ratio may be relatively small in comparison to that of the conventional carbon fiber. Such property of the composition may make it possible to omit a post-treatment process, such as, for example, a surface coating, necessary for the conventional carbon fiber, thereby improving lead time and productivity.

The present disclosure is described with reference to illustrative drawings, but is not limited by the examples described herein and accompanying drawings. It should be apparent to those skilled in the art that various changes which are not exemplified herein but are still within the spirit and scope of the present disclosure may be made. Further, it should be apparent that, although an effect from a configuration of the present disclosure are not clearly described in the examples of the present disclosure, any effect, which can be predicted from the corresponding configuration, is also to be acknowledged.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A carbon composite composition, comprising:
a binder comprising a phenolic resin;
a lubricant;
a base material consisting of silicon carbide (SiC), the base material determining a specific resistance of a resistance heating element at a high temperature, wherein the SiC is present in an amount of 50 to 70%, based on a total weight of the composition; and
a specific resistance controlling agent comprising silicon oxide ($SiO_2$).

2. The carbon composite composition according to claim 1, wherein the $SiO_2$ is present in an amount of 24 wt. % or less, based on the total weight of the composition.

3. The carbon composite composition according to claim 1, wherein the phenolic resin is a novolac resin.

4. The carbon composite composition according to claim 3, wherein the novolac resin is present in an amount of 15 to 30 wt. %, based on the total weight of the composition.

5. The carbon composite composition according to claim 1, wherein the composition does not comprise a curing agent of hexamine for curing the phenolic resin.

6. The carbon composite composition according to claim 5, wherein the lubricant acts as a curing agent of the phenolic resin.

7. The carbon composite composition according to claim 6, wherein the lubricant is graphite.

8. The carbon composite composition according to claim 7, wherein the graphite is present in an amount of 0.1 to 10 wt. %, based on the total weight of the composition.

9. A carbon composite composition, comprising:
  a binder comprising a novolac resin;
  a lubricant comprising graphite; and
  a base material consisting of silicon carbide (SiC), the base material determining a specific resistance of a resistance heating element at a high temperature, wherein the SiC is present in an amount of 50 to 70%, based on a total weight of the composition; and
  a specific resistance controlling agent comprising silicon oxide ($SiO_2$).

10. The carbon composite composition according to claim 9, wherein the novolac resin is present in an amount of 15 to 30 wt. %; and the graphite is present in an amount of 0.1 to 10 wt. %, based on the total weight of the composition.

11. The carbon composite composition according to claim 9, wherein the composition does not comprise a curing agent of hexamine for curing the phenolic resin.

12. The composite for carbon composite according to claim 9, wherein the $SiO_2$ is present in an amount of 24 wt. % or less, based on the total weight of the carbon composite composition.

13. A carbon heater comprising the composition of claim 1.

14. A carbon heater comprising the composition of claim 9.

* * * * *